H. G. DAYTON.
Improvement in Tobacco Pipes.
No. 4,733. Reissued Feb. 6, 1872.
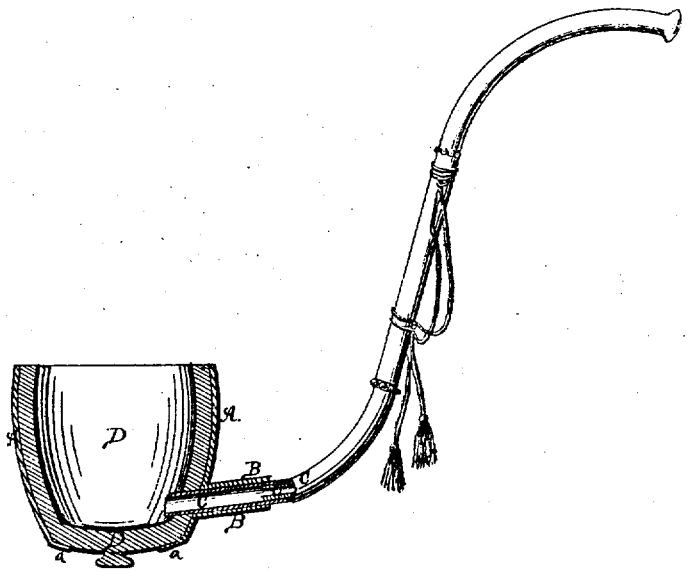
Witnesses
Philip M. Shuey
J. Trowbrig.
Inventor.
Henry G. Dayton,
per Fisher & Fisher
his Attorney
AM. PHOTO-LITHOGRAPHIC CO. N.Y. (OSBORNE'S PROCESS.)

UNITED STATES PATENT OFFICE.

HENRY G. DAYTON, OF MAYSVILLE, KENTUCKY, ASSIGNOR TO RICHARD H. COLLINS, OF CINCINNATI, OHIO.

IMPROVEMENT IN TOBACCO-PIPES.

Specification forming part of Letters Patent No. 77,803, dated May 12, 1868; reissue No. 4,733, dated February 6, 1872.

SPECIFICATION.

I, HENRY G. DAYTON, of Maysville, Kentucky, have invented a new and useful Improvement in Tobacco-Pipes, of which the following is a specification:

My invention relates to a tobacco-pipe bowl and a holder or support therefor, so constructed that the bowl can be removed at pleasure from said holder or support, and a new bowl inserted in its place. By this device a pipe can always be provided with a new, clean, inner bowl, and a clean pipe can always be had without the expense of a new stem or holder.

In the accompanying drawing is shown a vertical section through the center of the bowl and stem of a tobacco-pipe embodying my improvements.

*General Description.*

D represents a movable and changeable bowl, made of suitable material, and perforated to secure a smoke passage from the bowl through the stem. It is immaterial at what point on the bowl the perforation is made. A is a holder to support the bowl D, and is connected to the tube or stem *c* by a suitable device, one form of which is shown as socket B. The particular form of the holder is immaterial. The holder is made so that it properly supports the bowl, and at the same time permits the bowl to be removed at will and a new bowl to be substituted in its place.

Having thus described my invention, I claim as new and desire to secure by Letters Patent—

A tobacco-pipe provided with a changeable non-conducting bowl, supported by an external ring, frame, or holder, substantially as described.

HENRY G. DAYTON.

Witnesses:
W. W. BALL,
GEO. C. ROBINSON.